(12) United States Patent
Tassie

(10) Patent No.: US 10,668,998 B2
(45) Date of Patent: Jun. 2, 2020

(54) LIFE VEST POUCH

(71) Applicant: Courtney Tassie, Newport Beach, CA (US)

(72) Inventor: Courtney Tassie, Newport Beach, CA (US)

( * ) Notice: Subject to any disclaimer, the term of this patent is extended or adjusted under 35 U.S.C. 154(b) by 0 days.

(21) Appl. No.: 16/014,800

(22) Filed: Jun. 21, 2018

(65) Prior Publication Data

US 2019/0389547 A1    Dec. 26, 2019

(51) Int. Cl.
*B63C 9/23* (2006.01)
*B64D 25/18* (2006.01)

(52) U.S. Cl.
CPC .............. *B63C 9/23* (2013.01); *B64D 25/18* (2013.01)

(58) Field of Classification Search
CPC .................... B63C 9/23; B64D 25/18
USPC ...................................... 383/98, 99
See application file for complete search history.

(56) References Cited

U.S. PATENT DOCUMENTS

| 649,768 | A | * | 5/1900 | Sherriff | B65D 27/06 229/306 |
|---|---|---|---|---|---|
| 1,655,460 | A | * | 1/1928 | Galbraith | B65D 75/14 229/87.01 |
| 1,658,981 | A | * | 2/1928 | Galbraith | B65D 65/22 229/87.15 |
| 1,676,286 | A | * | 7/1928 | Ratcliff | B65D 27/00 229/87.17 |
| 1,731,996 | A | * | 10/1929 | Appelbaum | B65D 85/18 206/288 |
| 2,984,400 | A | * | 5/1961 | Kuchenbecker | B65D 5/106 229/158 |
| 3,037,684 | A | * | 6/1962 | Andrews | B65D 5/106 229/102 |
| 3,040,965 | A | * | 6/1962 | Meyers | B65D 5/541 229/102 |
| 3,061,168 | A | * | 10/1962 | Galloway | B65D 5/106 229/102 |
| 3,516,098 | A | | 6/1970 | O'Link | |
| 3,623,683 | A | | 11/1971 | Bennett | |
| 6,045,035 | A | * | 4/2000 | Murakami | B65D 27/22 206/388 |
| 7,077,466 | B2 | | 7/2006 | Forstner et al. | |
| 9,561,859 | B2 | | 2/2017 | White | |

(Continued)

FOREIGN PATENT DOCUMENTS

DE    102012004154 A1 *  9/2013  ............. A47C 13/10
FR         3058124 A1 *  5/2018  ............... B63C 9/23

(Continued)

*Primary Examiner* — Jes F Pascua
(74) *Attorney, Agent, or Firm* — Kenneth L. Green; Averill & Green

(57) ABSTRACT

A life vest pouch is closed by overlapping panels. A male panel is attached to an upper face portion and includes three inserted flaps and a female panel is attached to a lower face portion and includes four cuts. Two center cuts are vertical and receive opposite ends of a center flap and two outer cuts receive outer flaps. The opposite ends of the center flap are generally triangular and overlap the outer flaps. The panels are made from polycarbonate or the like. The pouch is opened by pulling a strap attached to the lower face portion. A tamper proof seal is attached to both upper and lower face portions and is torn if the pouch is opened.

14 Claims, 2 Drawing Sheets

(56) References Cited

U.S. PATENT DOCUMENTS

| | | | |
|---|---|---|---|
| 2003/0111521 A1* | 6/2003 | Holmes | B65D 5/0254 |
| | | | 229/117 |
| 2004/0239435 A1 | 12/2004 | Hughes et al. | |
| 2007/0015422 A1 | 1/2007 | Everhart et al. | |
| 2008/0106127 A1 | 5/2008 | Hough et al. | |
| 2009/0001779 A1 | 1/2009 | Wieland | |
| 2009/0242695 A1 | 10/2009 | Lamoree et al. | |
| 2015/0034641 A1* | 2/2015 | Aruga | B64D 11/0631 |
| | | | 220/214 |
| 2015/0038030 A1* | 2/2015 | White | B63C 9/23 |
| | | | 441/88 |
| 2018/0215470 A1* | 8/2018 | Wickham | B64D 11/0631 |

FOREIGN PATENT DOCUMENTS

| | | | | |
|---|---|---|---|---|
| GB | 2547024 A | | 9/2017 | |
| WO | WO-2015145121 A1 * | | 10/2015 | ....... G06K 19/07798 |
| WO | WO 2015/189721 A2 | | 12/2015 | |
| WO | WO-2017121895 A1 * | | 7/2017 | ......... B64D 11/0631 |
| WO | WO 2017/190854 A1 | | 11/2017 | |

\* cited by examiner

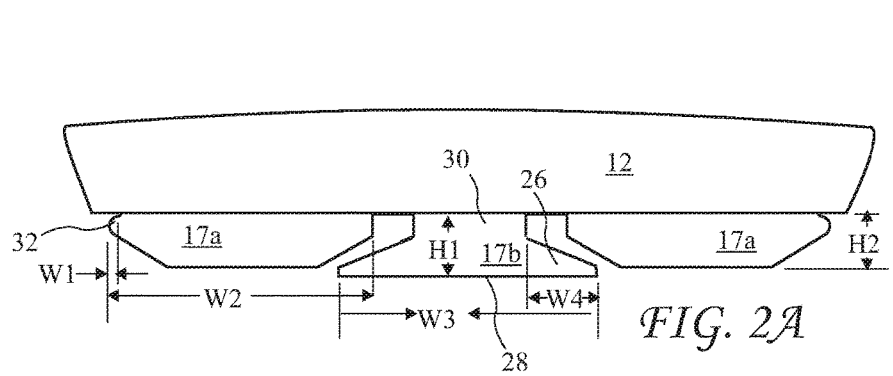
FIG. 2A
FIG. 2B
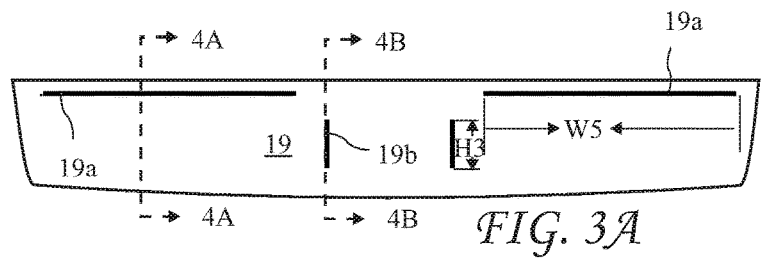
FIG. 3A
FIG. 3B
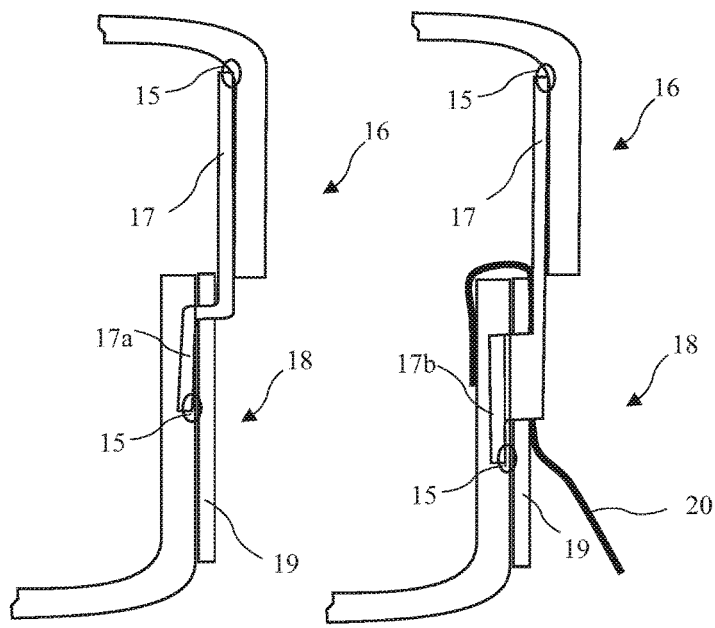
FIG. 4A
FIG. 4B

LIFE VEST POUCH

BACKGROUND OF THE INVENTION

The present invention relates to life vest pouches and in particular to a easy release life vest pouch for positioning under airline seats.

Nearly all commercial airlines are required to provide life vests for each passenger. The file vests are generally stored under seats in a life vest pouch, and the pouch is opened to provide access to the life vest. Known life vest pouches use overlapping hook and loop fasteners, and have not always consistently remained closed or easily opened.

BRIEF SUMMARY OF THE INVENTION

The present invention addresses the above and other needs by providing a life vest pouch which is closed by overlapping panels. A male panel is attached to an upper face portion and includes three inserted flaps and a female panel is attached to a lower face portion and includes four cuts. Two center cuts are vertical and receive opposite ends of a center flap and two outer cuts receive outer flaps. The opposite ends of the center flap are generally triangular and overlap the outer flaps. The panels are made from polycarbonate or the like. The pouch is opened by pulling a strap attached to the lower face portion. A tamper proof seal is attached to both upper and lower face portions and is torn if the pouch is opened.

In accordance with one aspect of the invention, there is provided a life vest pouch closed by overlapping panels. Three flaps of an upper panel pass through cuts in the lower panel. The cooperation of the panels provides a repeatable disengagement desired for safety equipment.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 2A is a front view of an upper face portion of the life vest pouch according to the present invention.

FIG. 2B is a side view of the upper face portion of the life vest pouch according to the present invention.

FIG. 3A is a front view of a lower face portion of the life vest pouch according to the present invention.

FIG. 3B is a side view of the lower face portion of the life vest pouch according to the present invention.

FIG. 4A shows an engagement of outer flaps of the upper panel with a horizontal cut of lower panel.

FIG. 4B shows an engagement of a center flap of the upper panel with a vertical cut of lower panel.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement.

Figure 1A:
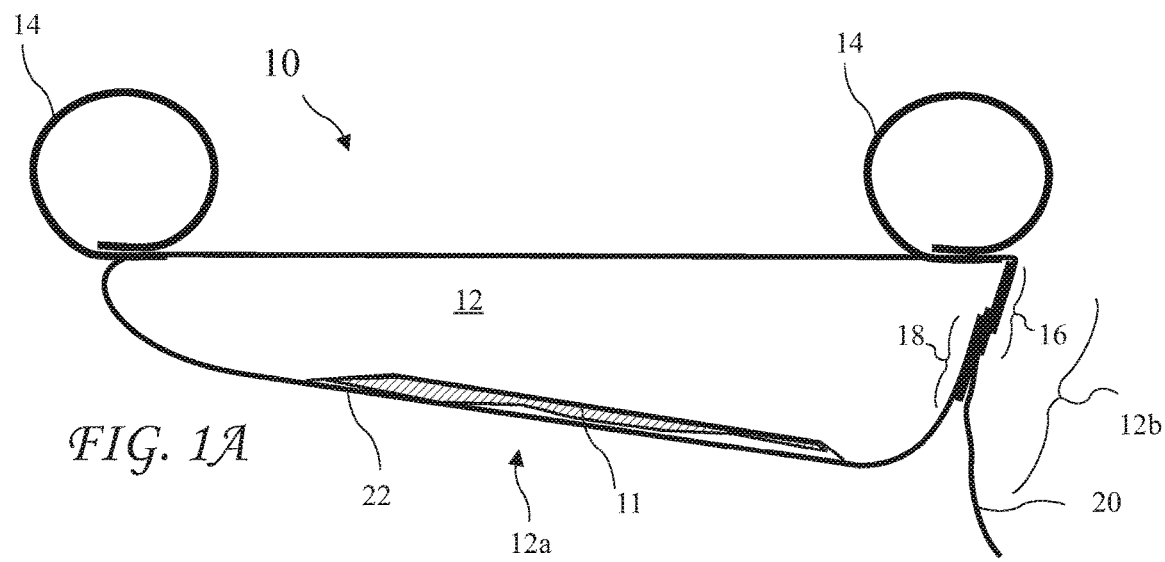
FIG. 1A is a side view of a life vest pouch according to the present invention.
Figure 1B:
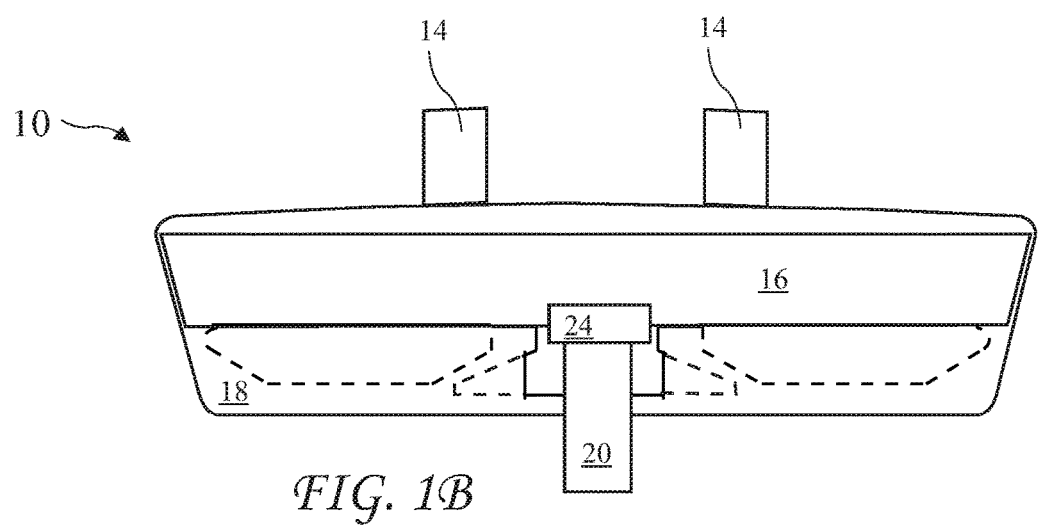
FIG. 1B is a front view of the life vest pouch according to the present invention.
Figure 1C:
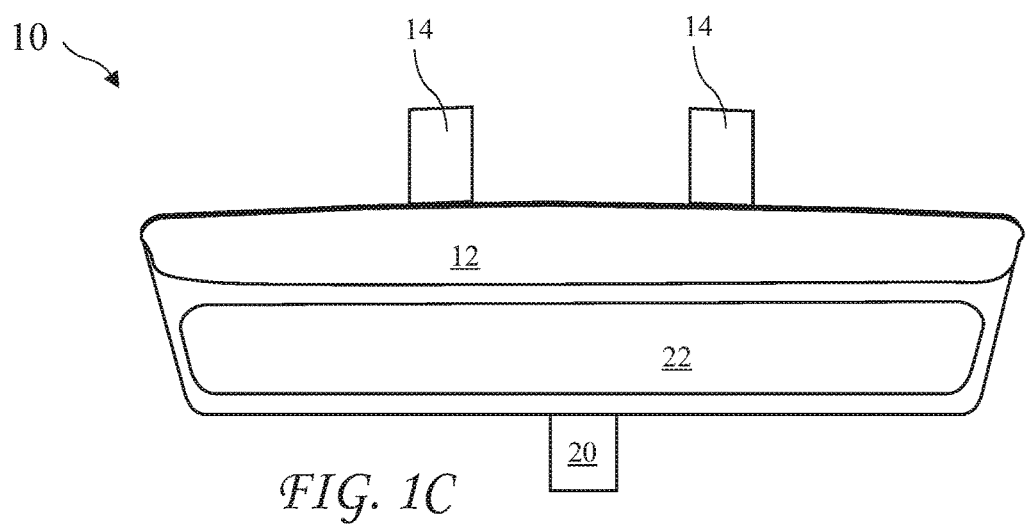
FIG. 1C is a rear view of the life vest pouch according to the present invention.

A side view of a life vest pouch 10 according to the present invention is shown in FIG. 1A, a front view of the life vest pouch 10 is shown in FIG. 1B, and a rear view of the life vest pouch 10 is shown in FIG. 1B. The life vest pouch 10 includes a fabric body 12 preferably made from ballistic nylon, rip-stop nylon, or the like, and is preferably constructed by stitching using polyester thread. Loops 14 are attached to the top of the body 12 at front and rear locations and are of suitable length to wrap around airline seat support structures. A clear window 22 in the bottom 12a of the body 12 allows viewing a life vest 11 residing inside the life vest pouch 10.

The front (or face) 12b of the life vest pouch 10 includes a top face portion 16 overlapping a bottom face portion 18. A tamper seal 24 is attached to both the top face portion 16 and the bottom face portion 18. A pull tab 20 is attached to an inside surface of the bottom face portion 18, loops over the top of the bottom face portion 18, and down between the bottom face portion 18 and the top face portion 16, and out of the life vest pouch 10.

A front view of the top face portion 16 is shown in FIG. 2A and a side view of the top face portion 16 is shown in FIG. 2B. An upper panel 17 is attached inside a portion of the body 12 folded down in the top face portion 16. The upper panel 17 includes outer flaps 17a, and a center flap 17b. The outer flaps have roughly trapezoidal shapes with overall widths W2 and height H2, and with a squared off inside end and a rounded outside end. The rounded outside ends 32 cut back a distance W1 back towards the opposite squared off inside end. The center flap 17b includes triangular projections 26 extending out on right and left sides of a rectangular base 30 to a horizontal lip 28. The center flap 17b has an overall width W3 and height H1. The triangular projections 26 reach a width W4 outside the rectangular base 30. The upper panel 17 is preferably a clear plastic material, and more preferably a 0.02 thick clear polycarbonate material.

A front view of the bottom face portion 18 of the life vest pouch 10 is shown in FIG. 3A and a side view of the bottom face portion 18 is shown in FIG. 3B. A lower panel 19 is attached outside a portion of the body 12 folded up in the bottom face portion 18. The lower panel 19 includes two outer horizontal cuts 19a having a width W5, and two vertical center cuts 19b having a height H3. The lower panel 19 is preferably a clear plastic material, and more preferably 0.02 thick clear polycarbonate material.

An engagement of the flaps 17a of the upper panel 17 with the cuts 19a of lower panel 19 is shown in FIG. 4A. The entire (or nearly entire) flaps 17a pass through the cuts 19a in the panel 19 and into a space between the panel 19 and the body material 12. The upper and lower panels 17 and 19 may be attached to the top face portion 16 and the bottom face portion 18 by stitching 15.

An engagement of a center flap 17b of the top face portion 16 with the vertical cuts 19b of bottom face portion 18 is shown in FIG. 4B. The triangular projections 26 of the center flap 17b pass outwardly through the cuts 19b into a space between the panel 19 and the body material 12. The rectangular base 30 remains outside the panel 19.

In millimeters, the dimension, + or −20 percent, of the life vest pouch 10 are:

| | |
|---|---|
| W1 | 1.7 |
| W2 | 68 |
| W3 | 68.5 |
| W4 | 19.5 |
| W5 | 69.3 |
| H1 | 18.5 |
| H2 | 15 |
| H3 | 15.3 |

While the invention herein disclosed has been described by means of specific embodiments and applications thereof, numerous modifications and variations could be made thereto by those skilled in the art without departing from the scope of the invention set forth in the claims.

I claim:

1. A life vest pouch, comprising:
    a body configured to contain a life vest;
    an opening face of the body, the face comprising:
        a top face portion including an upper panel having at least one flap extending down; and
        a bottom face portion including a lower panel having at least one cut, the at least one flap inserted through the at least one cut holding the opening face closed,
    wherein:
    the at least one flap comprises three downward reaching flaps;
    the at least one cut comprises at least three cuts configured to receive the three downward reaching flaps; and
    a pull strap is attached to an inside surface of the bottom face portion, passes over a top of the bottom face portion, down between overlapping portions of the top face portion and the bottom face portion, and out of the life vest pouch.

2. The life vest pouch of claim 1, further including a tamper proof seal, wherein opening the opening face of the body tears the tamper proof seal.

3. The life vest pouch of claim 1, further including a window in a bottom of the body, the window providing viewing of the life vest inside the life vest pouch.

4. The life vest pouch of claim 1, wherein the flaps are part of the upper panel attached to the top face portion.

5. The life vest pouch of claim 4, wherein the cuts are in the lower panel attached to the bottom face portion.

6. The life vest pouch of claim 5, wherein upper panel and the lower panel are a plastic material.

7. The life vest pouch of claim 5, wherein upper panel and the lower panel are a see through plastic material.

8. The life vest pouch of claim 5, wherein upper panel and the lower panel are attached to the top face portion and the bottom face portion respectively by stitching.

9. A life vest pouch, comprising:
    a body configured to contain a life vest;
    an opening face of the body, the face comprising:
        a top face portion including an upper panel having at least one flap extending down; and
        a bottom face portion including a lower panel having at least one cut, the at least one flap inserted through the at least one cut holding the opening face closed,
    wherein:
    the at least one flap comprises three downward reaching flaps;
    the at least one cut comprises at least three cuts configured to receive the three downward reaching flaps, and
    the at least three cuts comprise two outer horizontal cuts and two inner vertical cuts.

10. The life vest pouch of claim 9, wherein the three downward reaching flaps comprise:
    two outer flaps tapered narrower as the two outer flaps reach downward; and
    a center flap including ends configured to reach out and through the two inner vertical cuts.

11. The life vest pouch of claim 10, wherein the ends of the center flap are triangular.

12. The life vest pouch of claim 11, wherein outer ends of the two outer flaps are rounded and cut back towards opposite squared off inside end at tops of the outer flaps.

13. A life vest pouch, comprising:
    a body configured to contain a life vest;
    an opening face of the body, the face comprising:
        a top face portion;
        an upper panel attached to the top face portion and having two outer flaps tapered narrower as the two outer flaps reach downward and a center flap including outward extending right and left ends;
        a bottom face portion; and
        a lower panel attached to the bottom face portion and having two outer horizontal cuts and two inner vertical cuts, the outer flaps configured to reach down into the outer horizontal cuts and the outward extending right and left ends of the center flap configured to reach out and through the two inner vertical cuts, holding the opening face closed.

14. A life vest pouch, comprising:
    a body configured to contain a life vest;
    an opening face of the body, the face comprising:
        a top face portion;
        an upper panel attached to the top face portion and having two outer flaps tapered narrower as the two outer flaps reach downward and a center flap including outward extending right and left triangular ends;
        a bottom face portion; and
        a lower panel attached to the bottom face portion and having two outer horizontal cuts and two inner vertical cuts, the outer flaps configured to reach down into the outer horizontal cuts and the outward extending right and left triangular ends of the center flap configured to reach out and through the two inner vertical cuts, holding the opening face closed, the flaps disengageable from the slots to open the opening face; and
    pull strap is attached to an inside surface of the bottom face portion, passing over a top of the bottom face portion, down between overlapping portions of the top face portion and the bottom face portion, and out of the life vest pouch.

* * * * *